United States Patent [19]

Suzuki

[11] Patent Number: 5,848,221

[45] Date of Patent: Dec. 8, 1998

[54] RECORDING AND REPRODUCTION OF VIDEO SIGNAL

[75] Inventor: Koji Suzuki, Yokohama, Japan

[73] Assignee: Victor Company of Japan, Ltd., Yokohama, Japan

[21] Appl. No.: 738,587

[22] Filed: Oct. 29, 1996

Related U.S. Application Data

[62] Division of Ser. No. 326,426, Oct. 20, 1994, abandoned.

[30] Foreign Application Priority Data

Oct. 22, 1993 [JP] Japan .................................... 5-287549

[51] Int. Cl.$^6$ ........................... H04N 5/926; H04N 5/91; H04N 11/24
[52] U.S. Cl. ............................. 386/124; 386/123; 386/37
[58] Field of Search ................................... 386/16, 37, 1, 386/9, 27, 31, 33, 34, 66, 124, 109, 112, 123, 40; 360/32; H04N 5/926, 5/91, 11/24

[56] References Cited

U.S. PATENT DOCUMENTS 4,618,893  10/1986  Hirota et al. ............................ 358/167
4,658,305  4/1987  Tsushima ................................ 358/327
5,148,290  9/1992  Yamaguchi et al. .................... 358/314
5,526,136  6/1996  Hisikura et al. .......................... 386/46
5,583,648  12/1996  Ichinoi et al. ............................ 386/37

FOREIGN PATENT DOCUMENTS

0532276   3/1993   European Pat. Off. .
1-064480  3/1989   Japan .
4-061493  2/1992   Japan .
4-117076  4/1992   Japan .
6-197316  7/1994   Japan .

*Primary Examiner*—Robert Chevalier
*Attorney, Agent, or Firm*—Lowe, Price, LeBlanc & Becker

[57] ABSTRACT

A video signal recording apparatus includes a first device for processing a first time segment of a video signal in response to a second time segment of the video signal. The first time segment relates to a first frame or field while the second time segment relates to a second frame or field which precedes the first frame or field. A second device is operative for interrupting the processing by the first device when the video signal starts to be subjected to an editing process. A third device is operative for recording an editing information signal and an output signal of the first device on a recording medium. The editing information signal represents a time of occurrence of the editing process.

5 Claims, 8 Drawing Sheets

FIG. 7(A)
COMPOSITE SIGNAL 18a

FIG. 7(B)

FIG. 8(A)
COMPOSITE SIGNAL 19a

RECORDING AND REPRODUCTION OF VIDEO SIGNAL

This application is a divisional of application Ser. No. 08/326,426 filed Oct. 20, 1994 now abandoned.

BACKGROUND OF THE INVENTION

This invention relates to a video signal recording apparatus and a video signal reproducing apparatus. This invention also relates to a method of recording a video signal.

Video signals tend to have a correlation between successive frames. In a video signal recording and reproducing apparatus, it is conceivable to enhance the signal-to-noise (S/N) ratio of a reproduced video signal by the following signal processing. Specifically, in a recording side, an original video signal to be recorded is processed by using a correlation between successive frames, and the resultant video signal is recorded on a recording medium. A reproducing side reads out the video signal from the recording medium, and processes the video signal in a manner opposite to the manner of the processing in the recording side to recover the original video signal.

Generally, an editing process causes the replacement of a recorded video signal by a new recorded video signal which does not have any correlation with the former video signal. Accordingly, the editing process makes difficult the enhancement of the S/N ratio of a reproduced video signal which uses a correlation between successive frames.

SUMMARY OF THE INVENTION

It is a first object of this invention to provide an improved video signal recording apparatus.

It is a second object of this invention to provide an improved video signal reproducing apparatus.

It is a third object of this invention to provide an improved method of recording a video signal.

It is accordingly a feature of this invention to provide a video signal.

DESCRIPTION OF THE PREFERRED EMBODIMENT

An apparatus according to an embodiment of this invention can record and reproduce either a combination of a high-definition video signal and an audio signal or a combination of a normal-definition video signal and an audio signal into and from a recording medium. The apparatus according to the embodiment of this invention will be also referred to as the signal recording and reproducing apparatus. A television signal of an HD (high definition) format, which is referred to as an HD signal, is used as an example of the combination of the high-definition video signal and the audio signal. A television signal of an NTSC format, which is referred to as an NTSC signal, is used as an example of the combination of the normal-definition video signal and the audio signal.

The signal recording and reproducing apparatus outputs an HD signal or an NTSC signal which contains an information signal at its time segment corresponding to a given line or lines of every frame (or field). The signal recording and reproducing apparatus receives and accepts such an information-signal-added HD signal or an information-signal-added NTSC signal.

Information Signal

Figure 1:
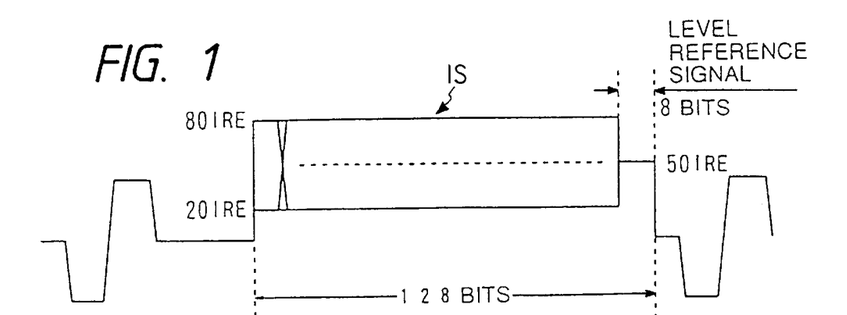
FIG. 1 is a diagram of the waveform of an information signal.
Figure 2:
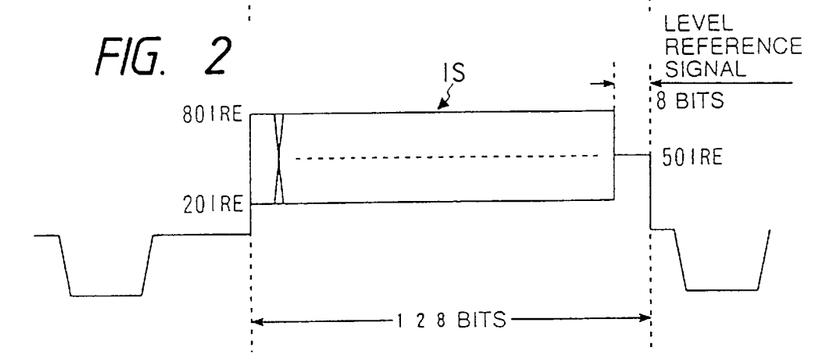
FIG. 2 is a diagram of the waveform of an information signal.

FIG. 1 shows an information signal IS which is interposed in a Y signal (a luminance signal) of the HD format at its time segment corresponding to a given line or lines of every frame (or field). FIG. 2 shows an information signal IS which is interposed in a Y signal (a luminance signal) of the NTSC format at its time segment corresponding to a given line or lines of every frame (or field). Each of the information signals IS of FIGS. 1 and 2 has a digital-signal portion and an analog-signal portion. The digital-signal portion precedes the analog-signal portion. The digital-signal portion has a sequence of 120 bits each changeable between 20 IRE and 80 IRE which correspond to logic levels of "0" and "I" respectively. The analog-signal portion occupies an interval corresponding to 8 bits. The analog-signal portion represents a level reference signal which has a constant level normally corresponding to 50 IRE.

Figure 3:
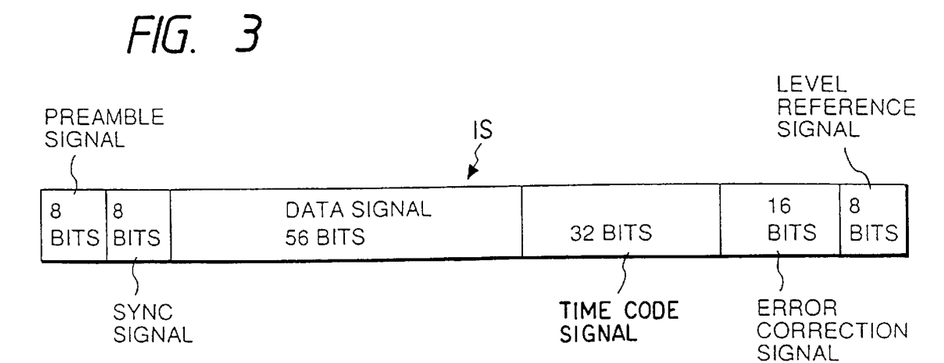
FIG. 3 is a diagram of the format of the information signals in FIGS. 1 and 2.

As shown in FIG. 3, each information signal IS has a sequence of an 8-bit preamble signal, an 8-bit sync signal, a 56-bit data signal, a 32-bit time code signal, a 16-bit error correction signal, and the level reference signal. The preamble signal, the sync signal, the data signal, the time code signal, and the error correction signal compose the previously-indicated digital-signal portion of the information signal IS. The preamble signal is used in providing synchronism with a clock signal during reproduction. The sync signal is used in discriminating a start of data (a start of the data signal). The data signal represents information such as the type of the related television signal (the currently-handled television signal). The time code signal represents time information. The error correction signal is used in detecting and correcting signal errors during reproduction. The level reference signal is used in controlling a recording level.

The data signal in the information signal IS has a sequence of 7 words each composed of 8 bits. The first word represents information of the format of the related television signal (the currently-handled television signal). Specifically, the first word represents aspect ratio information (discrimination between an aspect ratio of 16:9 and an aspect ratio of 4:3), picture display format information (discrimination between a letter box and an ordinary format), track system information (discrimination among HD, NTSC, and EDTV), and telecine information (discrimination between the same frame or another). Here, "EDTV" is short for extended definition television. The second word has program ID information representing a program number. The third word represents information regarding the related audio signal (discrimination among "stereophonic", "monophonic", and "bilingual"). The third word also represents information regarding an editing process (discrimination among editing start, editing end, and in-editing) which will be referred to as editing information.

Here, "in-editing" means that an editing process is currently executed. In addition, the third word represents corrective signal information (discrimination between the presence and the absence of a corrective signal), and control signal information (the duty ratios of control signals such as VISS and VASS). The fourth and fifth words represent text information containing character information according to a closed caption method. The sixth and seventh words are reserved.

The time code signal in the information signal IS has a sequence of 4 words each composed of 8 bits. The first word represents a frame number which is incremented every frame. The second, third, and fourth words represent "second", "minute", and "hour" respectively. It should be noted that the first word of the time code signal may represent a field number which is incremented every field.

Figure 4:
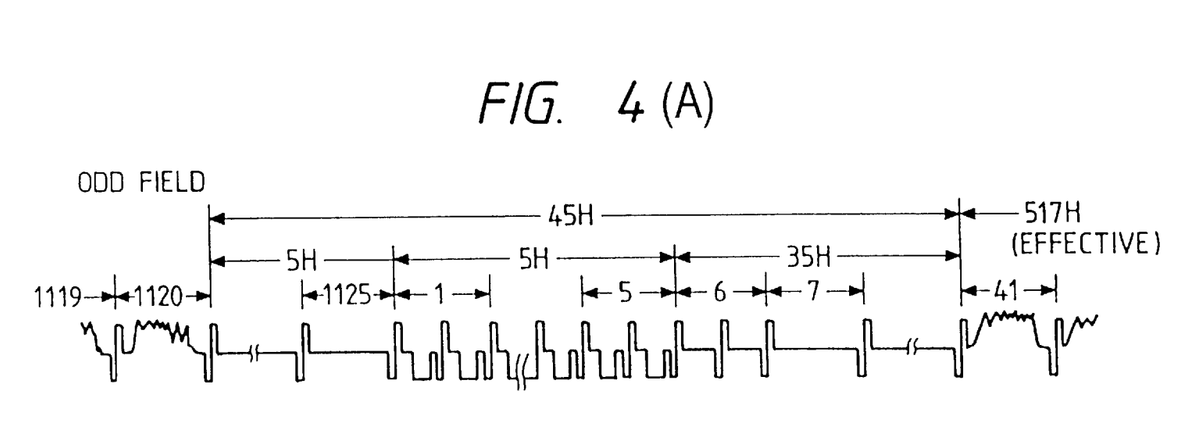
FIG. 4 is a diagram of the waveform of a high-definition television signal.

As shown in FIG. 4, a 1-frame HD signal has time segments corresponding to 1125 lines (horizontal scanning lines) respectively. Here, "lines" are short for horizontal scanning lines. In FIG. 4, numerals such as "1119", "1125", "1", "41", "557", "604" denote line order numbers. The start of the first line coincides with the start of a vertical sync signal in an odd field of every frame.

An information signal IS is interposed in a time segment of an HD signal which corresponds to a given line or lines of every frame. It is desirable that the line-corresponding signal segment or segments in which an information signal IS should be interposed are selected from among line-corresponding signal segments representative of display picture information with a low possibility of appearing on a display screen. Accordingly, in the case of an HD signal which is either a studio standard HD signal or a MUSE decoder output signal, it is preferable that an information signal IS is interposed in a signal time segment corresponding to a given line or lines selected from among the 41-st line to the 66-th line, the 532-nd to the 557-th line, the 603-rd line to the 628-th line, and the 1095-th line to the 1120-th line. It is most preferable that an information signal IS is interposed in a signal time segment corresponding to a given line or lines selected from among the 41-st line, the 42-nd line, the 557-th line, the 603-rd line, the 604-th line, the 1119-th line, and the 1120-th line.

The 41-st line and the 603-rd line correspond to ineffective horizontal scanning lines in the case of a MUSE decoder output signal but correspond to effective horizontal scanning lines in the case of an HD signal in conformity to the studio standards. Accordingly, in the case where an HD signal is not encoded into a MUSE signal, it is preferable to place an information signal IS in a signal time segment corresponding to at least one of the 41-st line and the 603-rd line.

In this embodiment, the signal recording and reproducing apparatus converts an original HD signal into an information-signal-added HD signal by adding an information signal IS to a time segment of the original HD signal which corresponds to the 603-rd line. In addition, the signal recording and reproducing apparatus receives and accepts an HD signal containing an information signal IS at its time segment corresponding to the 603-rd line or the 604-th line.

In the case of an NTSC signal, it is preferable that an information signal IS is interposed in a signal time segment corresponding to the 19-th line.

Recording Side

Figure 5:
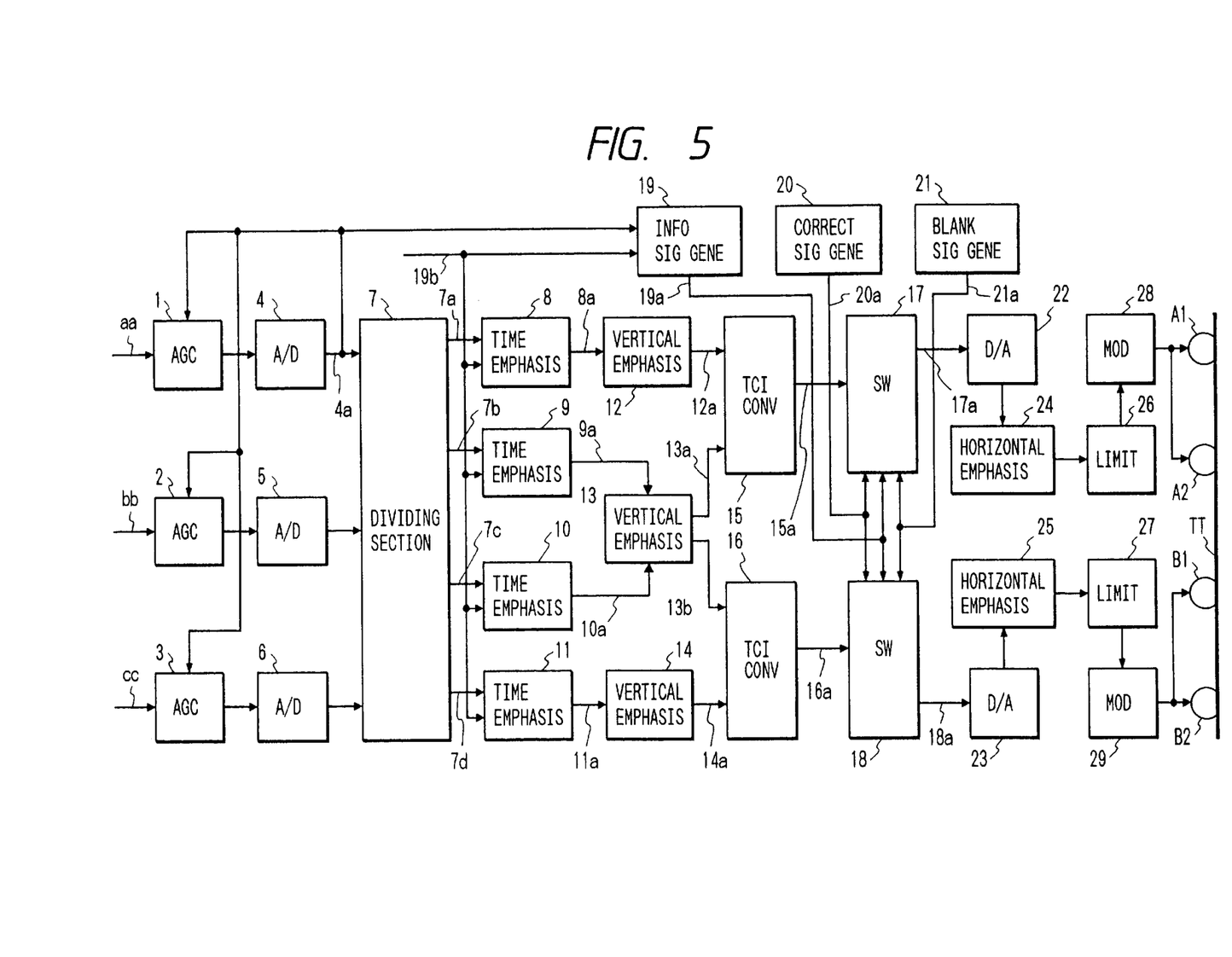
FIG. 5 is a block diagram of a recording side of a signal recording and reproducing apparatus according to an embodiment of this invention.

With reference to FIG. 5, a recording side of the signal recording and reproducing apparatus includes AGC sections 1, 2, and 3. An input Y signal (an input luminance signal) "aa" is fed to the AGC section 1 from a transmission line (not shown). Input PB and PR signals (input color signals) "bb" and "cc" are fed to the AGC sections 2 and 3 from the transmission line respectively. The input Y, PB, and PR signals "aa", "bb", and "cc" compose the video part of an HD signal or a MUSE decoder output signal.

The Y, PB, and PR signals are in conformity to the Japanese high-vision standards, and are generated from R, G, and B (red, green, and blue) signals by conversion expressed as follows.

$$Y=0.7154G+0.0721B+0.2125R$$

$$PB=0.5389(-0.7154G+0.9279B-0.2125R)$$

$$PR=0.6349(-0.7154G+0.0721B+0.7875R)$$

The AGC sections 1, 2, and 3 adjust the amplitude levels of the Y, PB, and PR signals in response to an output signal 4a from an A/D converter 4 which relates to the level reference signal in an information signal IS. The level reference signal contained in a signal segment corresponding to the 603-rd line is put in the first position of priority regarding operation of the AGC sections 1, 2, and 3. In the case where a signal segment corresponding to the 603-rd line lacks the level reference signal but a signal segment corresponding to the 604-th line contains the level reference signal, the AGC sections 1, 2, and 3 use the level reference signal in the 604-th-line signal segment. In the case where neither a signal segment corresponding to the 603-rd line nor a signal segment corresponding to the 604-th line contains the level reference signal, the AGC sections 1, 2, and 3 use the amplitude level of a horizontal sync signal instead of the level reference signal in controlling the amplitude levels of the Y, PB, and PR signals. Even if the input Y, PB, and PR signals have excessively large amplitudes, the amplitude-level control by the AGC sections 1, 2, and 3 prevents the occurrence of errors in an information signal IS during signal processing by amplitude limiters 26 and 27 at later stages.

The resultant Y, PB, and PR signals "aa", "bb", and "cc", that is, the output signals of the AGC sections 1, 2, and 3, are fed to A/D converters 4, 5, and 6 respectively, and are converted into corresponding digital signals thereby. The digital Y, PB, and PR signals, that is, the output signals of the A/D converters 4, 5, and 6 are fed to a signal dividing section 7 before being separated into two groups thereby.

Figure 6:
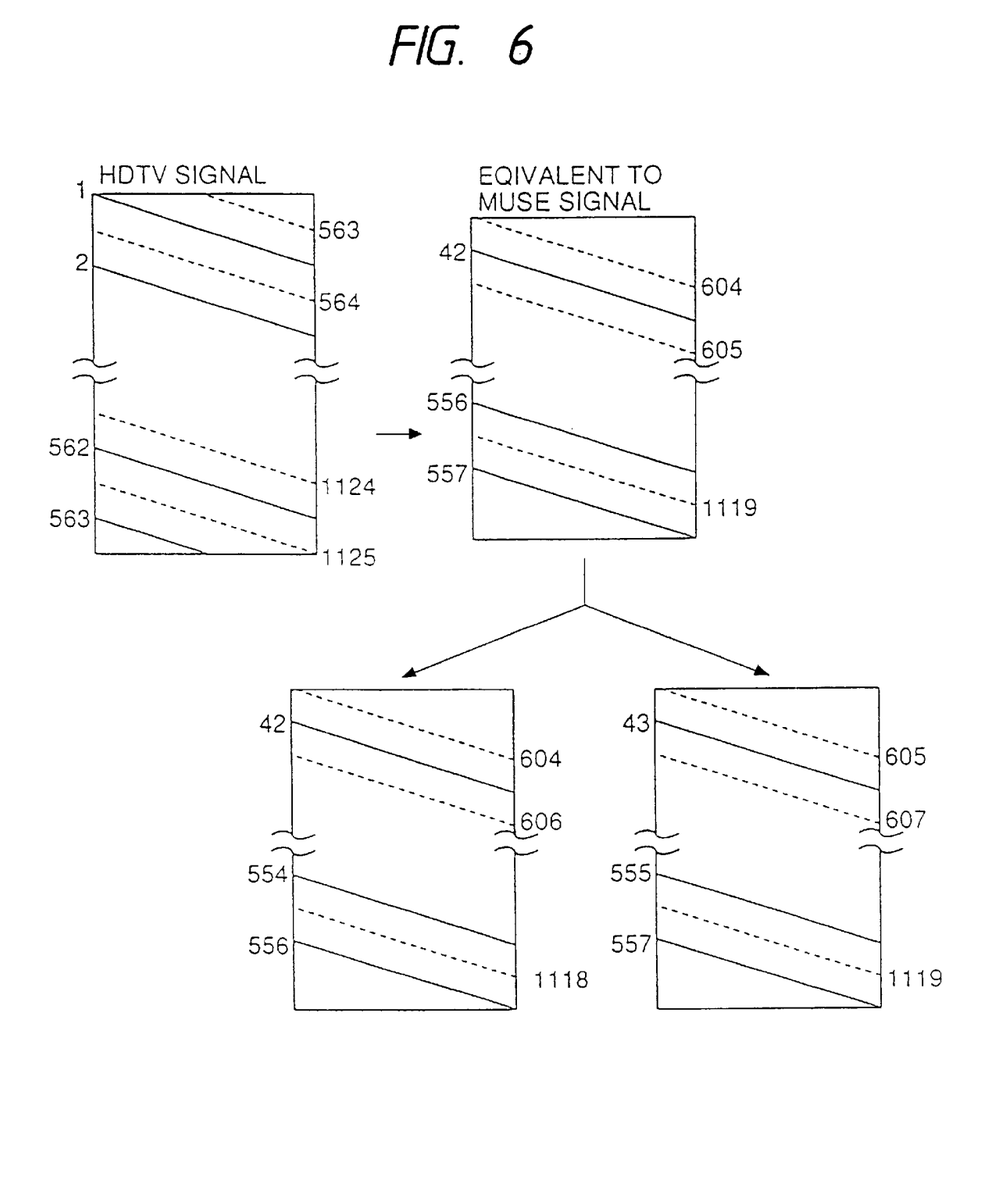
FIG. 6 is a flow diagram of operation of a dividing section in the apparatus of FIG. 5.

Operation of the signal dividing section 7 will now be described with reference to FIG. 6. In the case of an HD signal, some of 1125 lines composing one frame correspond to a vertical blanking period or other periods which have no relation with display picture information. Therefore, the recording of all 1125 lines into a recording medium causes a reduction of the efficiency of use of the recording medium regarding display picture information. To prevent such an efficiency reduction, as shown in FIG. 6, the Y, PB, and PR signals (composing the HD signal) are compressed into MUSE-corresponding signals by eliminating their segments related to sync components and related to regions above and below an effective display picture region. In the MUSE-corresponding signals, one frame is composed of 1032 lines equal in number to effective horizontal scanning lines of a frame of the MUSE format. Specifically, in the MUSE-corresponding signals, one frame is composed of the original 42-nd line to the original 557-th line, and the original 604-th line to the original 1119-th line. Further, the MUSE-corresponding signals are divided into line-corresponding segments which are separated into two groups as shown in the lower left and lower right sides of FIG. 6. The first group has signal segments related to the even-numbered lines while the second group has signal segments related to the odd-numbered lines. As a result, the Y signal is divided into a first sub Y signal 7b related to the even-numbered lines and a second sub Y signal 7c related to the odd-numbered lines. In addition, the PB signal is divided into a first sub PB signal related to the even-numbered lines and a second sub PB signal 7d related to the odd-numbered lines. Furthermore, the PR signal is divided into a first sub PR signal 7a related to the even-numbered lines and a second sub PR signal related to the odd-numbered lines. Here, the first sub PB signal related to the even-numbered lines and the second sub PR signal related to the odd-numbered lines are deleted or discarded. Accordingly, the signal dividing section 7 outputs the first sub PR signal 7a related to the even-numbered lines, the first sub Y signal 7b related to the even-numbered lines, the second sub Y signal 7c related to the odd-numbered lines, and the second sub PB signal 7d related to the odd-numbered lines.

Generally, a PB signal and a PR signal have a high correlation between successive lines. During reproduction, substitutes for the deleted portions of the PB signal and the PR signal are generated from the undeleted portions thereof in view of such a high correlation, and line sequential demodulation is executed regarding the PB signal and the PR signal.

The signal dividing section 7 includes, for example, frame memories and circuits for controlling the writing and reading of signals into and from the frame memories. In an alternative arrangement, the signal dividing section 7 includes switches changed in response to control signals having a period corresponding to one line.

Emphasis sections 8, 9, 10, and 11 receive the first sub PR signal 7a, the first sub Y signal 7b, the second sub Y signal 7c, and the second sub PB signal 7d from the signal dividing section 7 respectively. During a normal mode of operation, the emphasis sections 8, 9, 10, and 11 emphasize high-frequency components of the currently-received signals 7a, 7b, 7c, and 7d relative to low-frequency components thereof in a direction along a time base (a time-base direction or a time-axis direction) on the basis of the previously-received signals which relate to a plurality of previous frames (or fields). Thus, the emphases by the sections 8, 9, 10, and 11 use a video-signal correlation between successive frames (or fields). The emphases by the sections 8, 9, 10, and 11 are designed to enhance the S/N ratio of a reproduced video signal. The emphasis sections 8, 9, 10, and 11 output the emphasis-resultant PR signal 8a, the emphasis-resultant Y signal 9a, the emphasis-resultant Y signal 10a, and the emphasis-resultant PB signal 11a respectively.

The emphasis sections 8, 9, 10, and 11 receive an editing information signal 19b from a suitable device (not shown). The editing information signal 19b represents either of editing start, editing end, and in-editing. Operation of the emphasis sections 8, 9, 10, and 11 changes from the previously-indicated normal mode to a special mode in response to the editing information signal 19b which represents start of an editing process. During the special mode of operation, the processing of component video signals 7a, 7b, 7c, and 7d following a time of the occurrence of an editing process will be executed independent of component video signals 7a, 7b, 7c, and 7d preceding the time of the occurrence of the editing process and concerning a plurality of frames (or fields). In other words, the processing of current-frame (current-field) component video signals in response to preceding-frame (preceding-field) component video signals is interrupted upon a start of an editing process. Generally, the previously-indicated special mode of operation continues for only a given short interval, and terminates at a moment after the related editing process has been completed.

In this way, operation of the emphasis sections 8, 9, 10, and 11 is initialized and restarted when an editing process replaces an input video signal by another.

An emphasis section 12 receives the output PR signal 8a from the emphasis section 8. The emphasis section 12 emphasizes high-frequency components of the PR signal 8a relative to low-frequency components thereof in a vertical direction, and outputs the emphasis-resultant PR signal 12a to a TCI (time compressed integration) converter 15. An emphasis section 14 receives the output PB signal 11a from the emphasis section 11. The emphasis section 14 emphasizes high-frequency components of the PB signal 11a relative to low-frequency components thereof in a vertical direction, and outputs the emphasis-resultant PB signal 14a to a TCI converter 16.

An emphasis section 13 receives the output Y signals 9a and 10a from the emphasis sections 9 and 10. The emphasis section 13 rearranges line-corresponding segments of the Y signals 9a and 10a in a normal line order, and combines them into a complete Y signal. The emphasis section 13 emphasizes high-frequency components of the complete Y signal relative to low-frequency components thereof in a vertical direction, and divides the emphasis-resultant complete Y signal into a sub Y signal 13a related to the even-numbered lines and a sub Y signal 13b related to the odd-numbered lines in a manner similar to the manner of the signal division by the signal dividing section 7. The emphasis section 13 outputs the Y signals 13a and 13b to the TCI converters 15 and 16 respectively.

The TCI converter 15 compresses the received PR signal 12a and the received Y signal 13a line by line with respect to a time base. The TCI converter 15 multiplexes the compression-resultant PR and Y signals into a TCI signal 15a, and outputs the TCI signal 15a to a selector or switch 17.

The TCI converter 16 compresses the received PB signal 14a and the received Y signal 13b line by line with respect to a time base. The TCI converter 16 multiplexes the compression-resultant PR and Y signals into a TCI signal 16a, and outputs the TCI signal 16a to a selector or switch 18.

As previously described, the switch 17 receives the TCI signal 15a from the TCI converter 15. The switch 17 receives a TCI information signal 19a from an information signal generator 19. The switch 17 receives a corrective signal (calibration signal) 20a from a corrective signal generator (calibration signal generator) 20. The switch 17 receives a blanking signal 21a from a blanking signal generator 21. The blanking signal 21a contains a switching signal and a vertical sync signal.

Figure 7A:
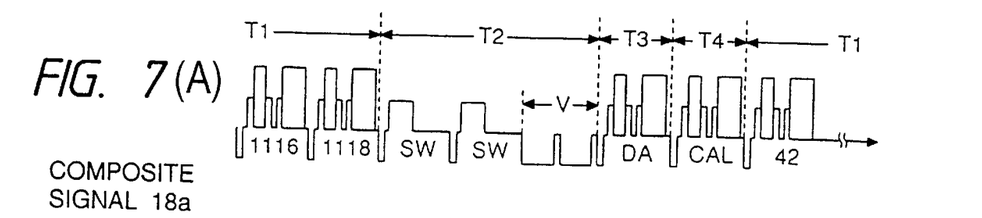
FIG. 7 is a diagram of the waveform of an even-line video signal in which a TCI information signal, a corrective signal, and other signals are interposed.
Figure 7B:
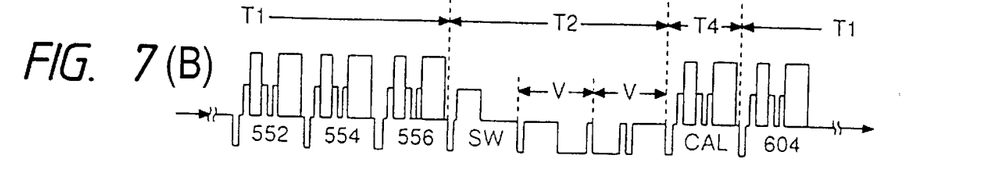

The switch 17 multiplexes the TCI signal 15a, the TCI information signal 19a, the corrective signal 20a, and the blanking signal 21a into a composite signal 17a. As shown in FIG. 7, during every period T1, the switch 17 selects the TCI signal 15a representing display picture information. During every period T2, the switch 17 selects the blanking signal 21a which contains the switching signal and the vertical sync signal. During every period T3, the switch 17 selects the TCI information signal 19a. During every period T4, the switch 17 selects the corrective signal 20a. As shown in FIG. 7, a sequence of periods T2, T3, and T4 extends between a period T1 ending at picture information of the 1118-th line of a preceding frame and a period T1 starting from picture information of the 42-nd line of a present frame. In addition, a sequence of periods T2 and T4 extends between a period T1 ending at picture information of the 556-th line and a period T1 starting from picture information of the 604-th line. In FIG. 7, "SW" denotes a switching signal 21a for providing a margin during which the recording heads are switched or changed, and "V" denotes a vertical sync signal 21a. In addition, "DA" denotes the TCI information signal 19a, and "CAL" denotes the corrective signal (calibration signal) 20a.

As previously described, the switch 18 receives the TCI signal 16a from the TCI converter 16. The switch 18 receives the TCI information signal 19a from the information signal generator 19. The switch 18 receives the corrective signal (calibration signal) 20a from the corrective signal generator (calibration signal generator) 20. The switch 18 receives the blanking signal 21a from the blanking signal generator 21. The blanking signal 21a contains the switching signal and the vertical sync signal.

Figure 8A:
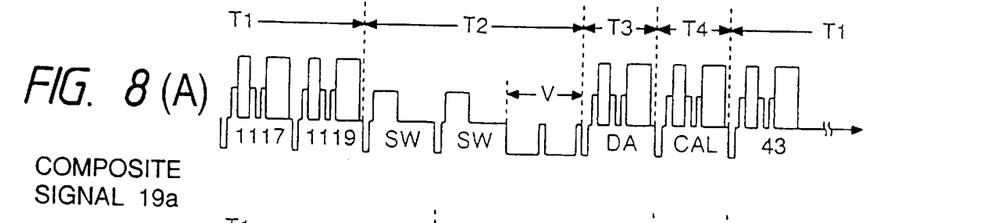
FIG. 8 is a diagram of the waveform of an odd-line video signal in which a TCI information signal, a corrective signal, and other signals are interposed.
Figure 8B:
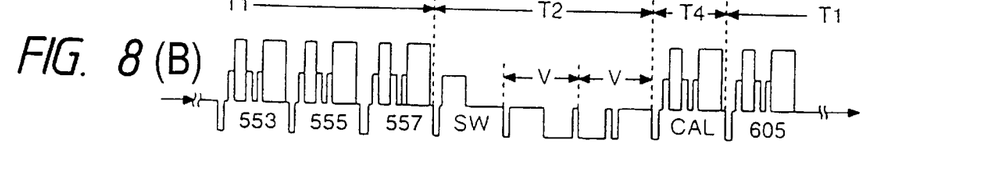

The switch 18 multiplexes the TCI signal 16a, the TCI information signal 19a, the corrective signal 20a, and the blanking signal 21a into a composite signal 18a. As shown in FIG. 8, during every period T1, the switch 18 selects the TCI signal 16a representing display picture information. During every period T2, the switch 18 selects the blanking signal 21a which contains the switching signal and the vertical sync signal. During every period T3, the switch 18 selects the TCI information signal 19a. During every period T4, the switch 18 selects the corrective signal 20a. As shown in FIG. 8, a sequence of periods T2, T3, and T4 extends between a period T1 ending at picture information of the 1119-th line of a preceding frame and a period T1 starting from picture information of the 43-rd line of a present frame. In addition, a sequence of periods T2 and T4 extends between a period T1 ending at picture information of the 557-th line and a period T1 starting from picture information of the 605-th line. In FIG. 8, "SW" denotes a switching signal 21a for providing a margin during which the recording heads are switched or changed, and "V" denotes a vertical sync signal 21a. In addition, "DA" denotes the TCI information signal 19a, and "CAL" denotes the corrective signal (calibration signal) 20a.

The information signal generator 19 will now be described. The information signal generator 19 receives the editing information signal 19b. The information signal generator 19 receives the output signal 4a of the A/D converter 4. The information signal generator 19 extracts an information signal from the output signal 4a of the A/D converter 4. Specifically, the information signal generator 19 discriminates the information signal from other signals by using a given level (for example, a maximum level of a horizontal sync signal) as a threshold value. The information signal generator 19 subjects the information signal to error detection and correction. As previously described, the information signal contains a data signal in which a third word represents editing information. The information signal generator updates the editing information in response to the editing information signal 19b indicating current editing conditions. Also, the information signal generator 19 updates program ID information, time code information (a time code signal), corrective signal information, and others in the information signal. In this way, the information signal generator 19 updates the information signal into a new information signal.

The information signal generator 19 includes an error-correction signal generator, an added-signal generator, and a modulator. The error-correction signal generator produces error-correction code words (an error correction signal) in response to the new time code signal and the new data signal, and adds the error-correction code words to the new time code signal and the new data signal. The error correction signal generator outputs the addition-resultant signal to the modulator. The added-signal generator produces a preamble signal and a sync signal, and outputs the preamble signal and the sync signal to the modulator.

Figures 9A, 9D:
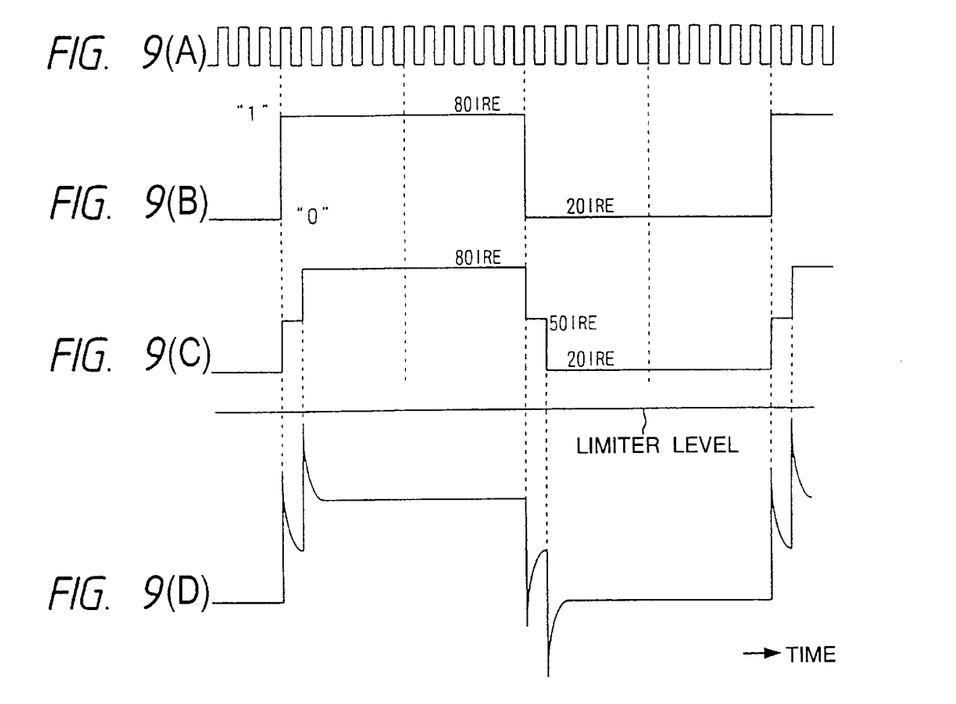
FIG. 9 is a diagram of the waveforms of various signals in the apparatus of FIG. 5.

In the Information signal generator 19, the output signal of the error correction signal generator and the output signal of the added-signal generator, which are received by the modulator, agree with 2-value signals changeable between two levels corresponding to "0" and "1" in time domain. The modulator converts the received 2-value signals into 3-value signals while combining the received 2-value signals. This conversion is to prevent the levels of the related signals from exceeding limiter levels in limiters 26 and 27. Specifically, the modulator uses a clock signal having a waveform such as shown in the portion (A) of FIG. 9. A sum of six periods of the clock signal corresponds to one bit of a received signal (the output signal of the error correction signal generator or the added-signal generator) which has a waveform such as shown in the portion (B) of FIG. 9. The level of the received signal is changeable between 20 IRE and 80 IRE corresponding to logic states of "0" and "1" respectively. The modulator executes the following modulation process. In the case of the "0" state of the received signal which is preceded by the "1" state, that is, in the case where the received signal has just changed from "1" to "0", the level of the modulation-resultant signal changes as 50 IRE, 20 IRE, 20 IRE, 20 IRE, 20 IRE, and 20 IRE at respective sample moments in six periods of the clock signal as shown in the portion (C) of FIG. 9. In the case of the "1" state of the received signal which is preceded by the "0" state, that is, in the case where the received signal has just changed from "0" to "1", the level of the modulation-resultant signal changes as 50 IRE, 80 IRE, 80 IRE, 80 IRE, 80 IRE, and 80 IRE at respective sample moments in six periods of the clock signal as shown in the portion (C) of FIG. 9. In the case of the "1" state of the received signal which is preceded by the "1" state, that is, in the case where the received signal has remained "1" during two bits, the level of the modulation-resultant signal keeps unchanged as 80 IRE, 80 IRE, 80 IRE, 80 IRE, 80 IRE, and 80 IRE at respective sample moments in six periods of the clock signal. In the case of the "0" state of the received signal which is preceded by the "0" state, that is, in the case where the received signal has remained "0" during two bits, the level of the modulation-resultant signal keeps unchanged as 20 IRE, 20 IRE, 20 IRE, 20 IRE, 20 IRE, and 20 IRE at respective sample moments in six periods of the clock signal. Thus, an intermediate level of 50 IRE is inserted in a level change of the received signal between 20 IRE and 80 IRE. The insertion of the. intermediate level of 50 IRE reduces a rate of a level change of the modulation-resultant signal so that the level of the related output signal of an emphasis section 24 or 25 can be prevented from exceeding a limiter level in the limiter 26 or 27 as shown in the portion (D) of FIG. 9. The respective values of the 3-value signal correspond to 20 IRE, 50 IRE, and 80 IRE. The modulator outputs the modulation-resultant signal to a switch (a multiplexer) within the information signal generator 19.

The emphasis sections 24 and 25 emphasize high-frequency signal components, and hence cause greater spike levels at time positions corresponding to display picture portions immediately after edges in a display picture. The conversion of the 2-value signal into the 3-value signal by the modulator in the information signal generator 19 suppresses such spike levels, thereby preventing the loss of edge information which would occur when the signal level exceeds the limiter level in the limiter 26 or 27.

The information signal generator 19 also includes a level reference signal generator which produces a level reference signal with a predetermined normal reference level (50 IRE). The level reference signal is outputted to the switch (multiplexer).

Figure 10:
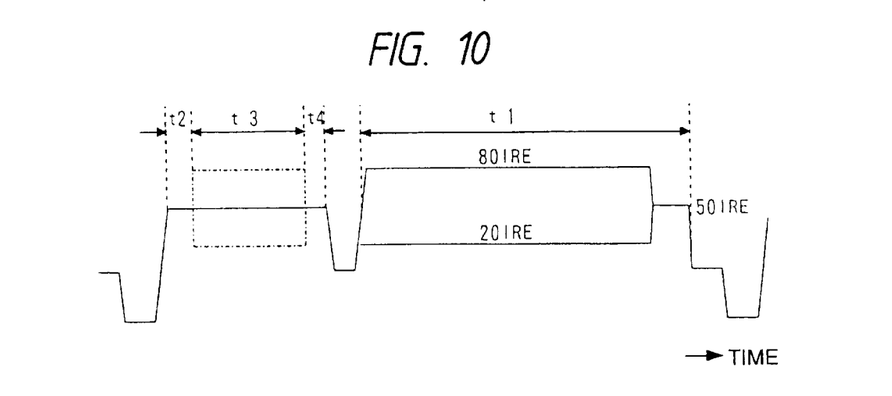
FIG. 10 is a diagram of the waveform of a TCI information signal in the apparatus of FIG. 5.

In the information signal generator 19, the switch (multiplexer) time-division-multiplexes the output signal of the modulator and the level reference signal into a TCI information signal 19a which has a waveform such as shown in FIG. 10. The information signal interposed in the 603-rd or 604-th line segment of the Y signal "aa" is time-base-compressed into a segment of the TCI Information signal 19a which occupies a period t1 in FIG. 10. The rate of compression of the information signal is set equal to the rate of compression of the Y signal "aa". Information signal may be interposed in at least one of the PB signal "bb" and the PR signal "cc".

The corrective signal generator (calibration signal generator) 20 includes a plurality of ROM's storing predetermined corrective signals of different types respectively. The corrective signal generator 20 also includes a switch for sequentially and cyclically selecting one of the corrective signals every frame. The corrective signal generator 20 outputs the selected corrective signal 20a to the switches 17 and 18. The corrective signals contain ramp signals for calibrating the linearities between the even-line processing system and the odd-line processing system, gray scale signals for adjusting the direct-current levels and the amplitude levels between the two systems, multi-burst signals for calibrating the frequency characteristics between the two systems, and 2T pulse signals for calibrating the phase characteristics between the two systems. For example, the 2T pulse signals have a sine-square form and a half width which equals a period of a frequency corresponding to a half of the related band.

The blanking signal generator 21 includes ROM's storing data representing the blanking signal 21a. The blanking signal generator 21 produces the blanking signal 21a which contains the switching signal and the vertical sync signal. The blanking signal generator 21 outputs the blanking signal 21a to the switches 17 and 18. As previously described, the blanking signal 21a which contains the switching signal "SW" and the vertical sync signal "V" is inserted during the periods T2 in FIGS. 7 and 8.

As previously described, the switch 17 multiplexes the TCI signal 15a, the TCI information signal 19a, the corrective signal 20a, and the blanking signal 21a into a composite signal 17a. The switch 17 outputs the composite signal 17a to a D/A converter 22. The composite signal 17a is changed into a corresponding analog signal by the D/A converter 22.

As previously described, the switch 18 multiplexes the TCI signal 16a, the TCI information signal 19a, the corrective signal 20a, and the blanking signal 21a into a composite signal 18a. The switch 18 outputs the composite signal 18ato a D/A converter 23. The composite signal 18a is changed into a corresponding analog signal by the D/A converter 23.

The emphasis sections 24 and 25 receive the output signals of the D/A converters 22 and 23 respectively. The emphasis sections 24 and 25 emphasize high-frequency components of the received signals relative to low-frequency components thereof in a horizontal direction, and output the emphasis-resultant signals to the limiters 26 and 27 respectively. The devices 26 and 27 limit the amplitudes of the emphasis-resultant signals with respect to predetermined limiter levels. FM modulators 28 and 29 receive the output signals 20 of the limiters 26 and 27, and subject the received signals to frequency modulation of a given deviation respectively. The output signal of the FM modulator 28 is fed via a recording amplifier (not shown) to magnetic heads A1 and A2 before being recorded on a magnetic tape TT thereby. The output signal of the FM modulator 29 is fed via a recording amplifier (not shown) to magnetic heads B1 and B2 before being recorded on the magnetic tape TT thereby. The magnetic heads A1, A2, B1, and B2 are mounted on a rotary drum.

Figure 11:
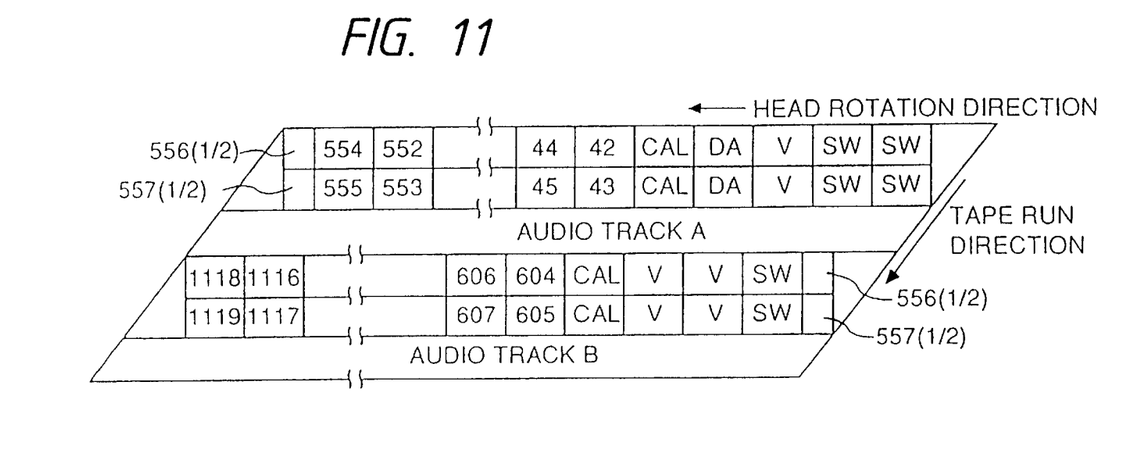
FIG. 11 is a diagram of a signal record pattern on a magnetic tape in the apparatus of FIG. 5.
Figure 12:
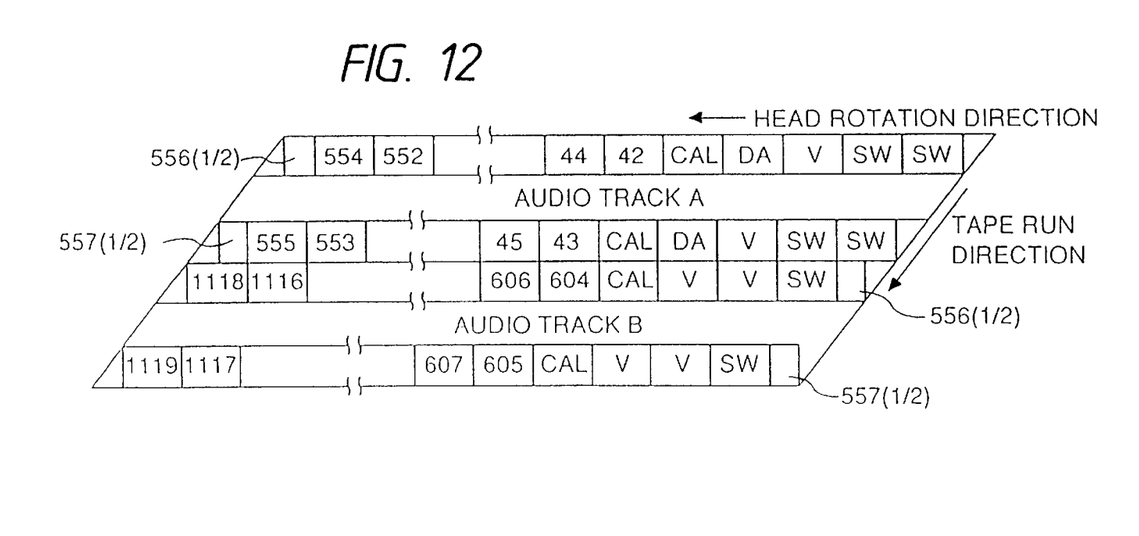
FIG. 12 is a diagram of another signal record pattern on a magnetic tape in the apparatus of FIG. 5.

The signal record pattern on the magnetic tape TT will now be described with reference to FIGS. 11 and 12, in which the numerals denote the line order numbers; "SW" denotes a switching signal; "V" denotes a vertical sync signal; "CAL" denotes a corrective signal (calibration signal); and "DA" denotes a TCI information signal. As shown in FIGS. 11 and 12, the magnetic tape TT is provided with video and audio tracks for storing video information, audio information, and other information, and the video and audio tracks extend in directions oblique with respect to the magnetic tape.

With reference to FIG. 11, the output signal of the FM modulator 28 which relates to the even-numbered lines is recorded on a video track between "SW" and "556(½)" via the magnetic head A1, and is recorded on a video track between "556(½)" and "1118" via the magnetic head A2. On the other hand, the output signal of the FM modulator 29 which relates to the odd-numbered lines is recorded on a video track between "SW" and "557(½)" via the magnetic head B1, and is recorded on a video track between "557(½)" and "1119" via the magnetic head B2. Two adjacent magnetic heads of the magnetic heads A1, A2, B1, and B2 can simultaneously execute recording processes. In this way, the magnetic heads A1, A2, B1, and B2 serve as video heads. There are also magnetic heads (not shown) for audio information. The audio heads, which precede the video heads A1, A2, B1, and B2, form audio tracks "A" and "B" respectively.

The attachment heights of the video heads A1, A2, B1, and B2 and the audio heads may be modified so as to provide another signal record pattern on the magnetic tape TT which is shown in FIG. 12.

Reproducing Side

Figure 13:
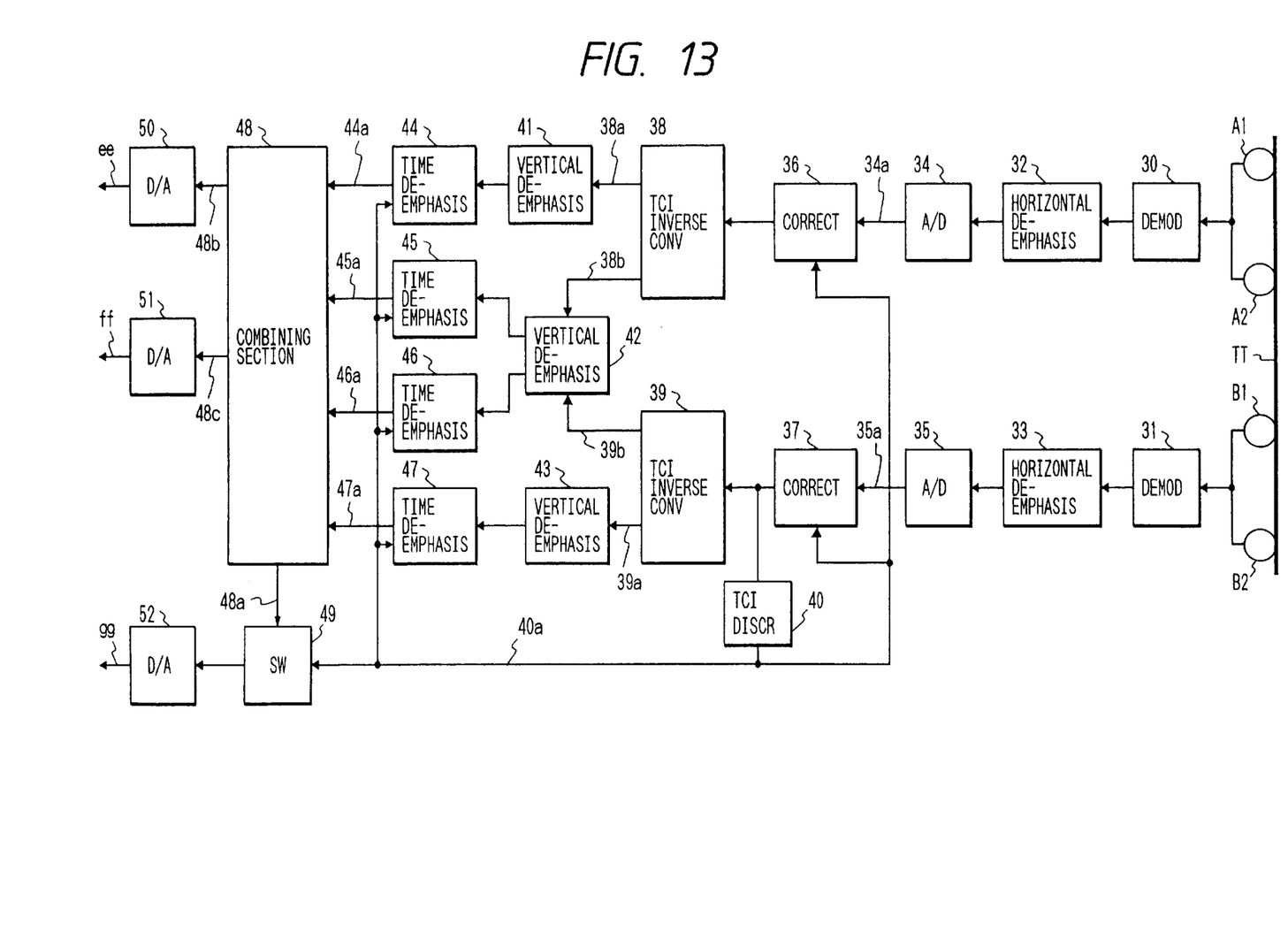
FIG. 13 is a block diagram of a reproducing side of the signal recording and reproducing apparatus according to the embodiment of this invention.

With reference to FIG. 13, a reproducing side of the signal recording and reproducing apparatus includes an FM demodulator 30 following the magnetic heads A1 and A2, and an FM demodulator 31 following the magnetic heads B1 and B2. Signals are reproduced from the magnetic tape TT by the magnetic heads A1, A2, B1, and B2. The reproduced signals are fed via amplifiers (not shown) to the FM demodulators 30 and 31, being subjected to FM demodulation thereby. The demodulation-resultant signals, that is, the output signals of the FM demodulators 30 and 31, are fed to deemphasis sections 32 and 33 having functions inverse with respect to the functions of the emphasis sections 24 and 25 in the recording side of the apparatus. Specifically, the deemphasis sections 32 and 33 attenuate high-frequency components of the output signals of the FM demodulators 30 and 31 relative to low-frequency components thereof in a horizontal direction. The output signals of the deemphasis sections 32 and 33 are fed to A/D converters 34 and 35, being converted thereby into corresponding digital reproduced signals 34a and 35a. The A/D converters 34 and 35 output the digital reproduced signals 34a and 35a to correcting sections 36 and 37 respectively.

The correcting section 36 calibrates or corrects the reproduced signal 34a in response to a control signal 40a representing the type of the previously-indicated corrective signal (calibration signal) 20a. The control signal 40a will be described later. The correcting section 37 calibrates or corrects the reproduced signal 35a in response to the control signal 40a.

The output signal of the correcting section 36 is fed to a TCI inverse converter 38. The output signal of the correcting section 37 is fed to a TCI inverse converter 39 and a TCI discriminator 40.

The TCI discriminator 40 extracts a TCI information signal 19a from the output signal of the correcting section 37. The TCI discriminator 40 samples and holds the level of the TCI information signal 19a which occurs during a period t2 or t3 in FIG. 10. The TCI discriminator 40 discriminates "0" and "1" in bits of the TCI information signal 19a while using the sampled and held level as a threshold value. The TCI discriminator 40 derives level information from a level reference signal in the TCI information signal 19a. The TCI discriminator 40 executes signal time-base expansion and thereby recovers the original information signal, and outputs the recovered information signal 40a to a switch or selector 49. The switch 49 interposes the information signal in a time segment of a Y signal which relates to the 603-rd line of every frame. The output signal 40a of the TCI discriminator 40 is also fed to the correcting sections 36 and 37 as a control signal.

The TCI inverse converters 38 and 39 have functions inverse with respect to the functions of the TCI converters 15 and 16 in the recording side of the apparatus. As previously described, the TCI inverse converter 38 receives the output signal of the correcting section 36 which contains the compressed line sequential color signal and the compressed luminance signal. The TCI inverse converter 38 expands the compressed line sequential color signal and the compressed luminance signal with respect to a time base, and thereby returns them into the original line sequential color signal and the original luminance signal (the reproduced Y signal) 38b. The TCI inverse converter 38 demodulates the original line sequential color signal into the reproduced PR signal 38a. The TCI inverse converter 38 outputs the reproduced PR signal 38a and the reproduced Y signal 38b to deemphasis sections 41 and 42 respectively. The reproduced PR and Y signals 38a and 38b relate to the even-numbered lines of every frame.

As previously described, the TCI inverse converter 39 receives the output signal of the correcting section 37 which contains the compressed line sequential color signal and the compressed luminance signal. The TCI inverse converter 39 expands the compressed line sequential color signal and the compressed luminance signal with respect to a time base, and thereby returns them into the original line sequential color signal and the original luminance signal (the reproduced Y signal) 39b. The TCI inverse converter 39 demodulates the original line sequential color signal into the reproduced PB signal 39a. The TCI inverse converter 39 outputs the reproduced PB signal 39a and the reproduced Y signal 39b to a deemphasis section 43 and the deemphasis section 42 respectively. The reproduced PB and Y signals 39a and 39b relate to the odd-numbered lines of every frame.

The deemphasis section 41 has a function inverse with respect to the function of the emphasis section 12 in the recording side of the apparatus. Specifically, the deemphasis section 41 attenuates high-frequency components of the reproduced PR signal 38a relative to low-frequency components thereof in a vertical direction. The deemphasis section 41 outputs the attenuation-resultant PR signal to a deemphasis section 44. The deemphasis section 43 has a function inverse with respect to the function of the emphasis section 14 in the recording side of the apparatus. Specifically, the deemphasis section 43 attenuates high-frequency components of the reproduced PB signal 39a relative to low-frequency components thereof in a vertical direction. The deemphasis section 43 outputs the attenuation-resultant PB signal to a deemphasis section 47.

The deemphasis section 42 has a function inverse with respect to the function of the emphasis section 13 in the recording side of the apparatus. As previously described, the deemphasis section 42 receives the reproduced Y signals 38b and 39b. The deemphasis section 42 rearranges line-corresponding segments of the reproduced Y signals 38b and 39b in a normal line order, and combines them into a complete Y signal. The deemphasis section 42 attenuates high-frequency components of the complete Y signal relative to low-frequency components thereof in a vertical direction.

The deemphasis section 42 divides the attenuation-resultant complete Y signal into a sub Y signal related to the even-numbered lines and a sub Y signal related to the odd-numbered lines in a manner similar to the manner of the signal division by the signal dividing section 7 in the recording side of the apparatus. The sub Y signal related to the even-numbered lines is outputted from the deemphasis section 42 to a deemphasis section 45. The sub Y signal related to the odd-numbered lines is outputted from the deemphasis section 42 to a deemphasis section 46.

The deemphasis sections 44, 45, 46, and 47 have functions inverse with respect to the functions of the emphasis sections 8, 9, 10, and 11 in the recording side of the apparatus respectively. As previously described, the deemphasis sections 44, 45, 46, and 47 receive the PR signal, the first sub Y signal, the second sub Y signal, and the PB signal respectively. During a normal mode of operation, the deemphasis sections 44, 45, 46, and 47 attenuate high-frequency components of the currently-received signals relative to low-frequency components thereof in a direction along a time base (a time-base direction or a time-axis direction) on the basis of the previously-received signals which relate to a plurality of previous frames (or fields). The deemphasis sections 44, 45, 46, and 47 output the deemphasis-resultant PR signal 44a, the deemphasis-resultant Y signal 45a, the deemphasis-resultant Y signal 46a, and the deemphasis-resultant PB signal 47a respectively.

The deemphasis sections 44, 45, 46, and 47 receive the information signal 40a from the TCI discriminator 40. The information signal 40a contains the editing information which represents either of editing start, editing end, and in-editing. Operation of the deemphasis sections 44, 45, 46, and 47 changes from the previously-indicated normal mode to a special mode in response to the editing information which represents start of an editing process. During the special mode of operation, the processing of component video signals (the PR signal, the first sub Y signal, the second sub Y signal, and the PB signal) following a time of the occurrence of an editing process will be executed independent of component video signals preceding the time of the occurrence of the editing process and concerning a plurality of frames (or fields). In other words, the processing of current-frame (current-field) component video signals in response to preceding-frame (preceding-field) component video signals is interrupted upon a start of an editing process. Generally, the previously-indicated special mode of operation continues for only a given short interval, and terminates at a moment after the related editing process has been completed.

In this way, operation of the deemphasis sections 44, 45, 46, and 47 is initialized and restarted when a reproduced video signal indicates the reception of an editing process.

The signal combining section 48 has a function inverse with respect to the function of the signal dividing section 7 in the recording side of the apparatus. The signal combining section 48 receives the PR signal 44a, the Y signal 45a, the Y signal 46a, and the PB signal 47a from the deemphasis sections 44, 45, 46, and 47 respectively. The Y signal 45a outputted from the deemphasis section 45 relate to the even-numbered lines while the Y signal 46a outputted from the deemphasis section 46 relate to the odd-numbered lines. The signal combining section 48 rearranges line-corresponding segments of the Y signals 45a and 46a in a normal line order, and combines them into a complete Y signal 48a. The PR signal 44a outputted from the deemphasis section 44 relates to the even-numbered lines. In the signal combining section 48, a substitute PR signal related to the odd-numbered lines is generated from the PR signal 44a related to the even-numbered lines. The signal combining section 48 rearranges line-corresponding segments of the two PR signals in a normal line order, and combines them into a complete PR signal 48b. The PB signal 47a outputted from the deemphasis section 47 relates to the odd-numbered lines. In the signal combining section 48, a substitute PB signal related to the even-numbered lines is generated from the PB signal 47a related to the odd-numbered lines. The signal combining section 48 rearranges line-corresponding segments of the two PB signals in a normal line order, and combines them into a complete PB signal 48c.

The signal combining section 48 outputs the complete Y signal 48a to the switch 49 by which the information signal 40a is added to the 603-rd line segment of the composite Y signal. The switch 49 outputs the resultant Y signal to a D/A converter 52. The resultant Y signal is converted by the D/A converter 52 into an analog Y signal "gg". The D/A converter 52 outputs the analog Y signal "gg" to a transmission line (not shown). The signal combining section 48 outputs the complete PR signal 48b to a D/A converter 50. The composite PR signal 48b is converted by the D/A converter 50 into an analog PR signal "ee". The D/A converter 50 outputs the analog PR signal "ee" to the transmission line (not shown). The signal combining section 48 outputs the complete PB signal 48c to a D/A converter 51. The composite PB signal 48c is converted by the D/A converter 51 into an analog PB signal "ff". The D/A converter 51 outputs the analog PB signal "ff" to the transmission line (not shown).

This invention can be applied to compression and expansion of a video signal by inter-frame or inter-field signal processing which uses, for example, orthogonal transform. In this case, the inter-frame or inter-field signal processing is controlled in response to editing information, that is, in response to whether or not an editing process starts.

While the TCI discriminator 40 processes the output signal of the correcting section 37 in the embodiment of this invention, the TCI discriminator 40 may be modified to process the output signal 35a of the A/D converter 35.

The signal recording and reproducing apparatus of the embodiment may be modified to record and reproduce video information into and from a recording medium (for example, an optical disk, a floppy disk, or a semiconductor memory) other than a magnetic tape.

The recording side or the reproducing side may be omitted from the signal recording and reproducing apparatus of the embodiment.

What is claimed is:

1. An apparatus comprising:
    first means for deleting predetermined time segments of an input video signal, and dividing a remainder of the input video signal into two partial video signals, the predetermined time segments corresponding to predetermined upper and lower lines containing a specified line, wherein a time segment of the input video signal which corresponds to the specified line represents an information signal;
    second means for emphasizing high frequency components of the partial video signals relative to low-frequency components thereof in a direction along a time base;
    third means for emphasizing high-frequency components of output signals of the second means relative to low-frequency components thereof in a vertical direction;
    fourth means for time-base-compressing and time-base-multiplexing output signals of the third means into TCI signals;
    fifth means for extracting the information signal from the input video signal, and converting the extracted information signal into a TCI information signal;
    sixth means for generating a corrective signal designed to compensate transmission characteristics;
    seventh means for combining the TCI signals, the TCI information signal, and the corrective signal into composite signals; and
    eighth means for recording the composite signals into a recording medium.

2. An apparatus as recited in claim 1, wherein the eighth means comprises:
    first sub means for emphasizing high-frequency components of the composite signals relative to low-frequency components thereof in a horizontal direction;
    second sub means for limiting amplitude levels of output signals of the first sub means;
    third sub means for subjecting output signals of the second sub means to FM modulation; and
    fourth sub means for recording output signals on the third sub means on the recording medium.

3. An apparatus as recited in claim 1, further comprising:
    ninth means for reproducing the composite signals from the recording medium;
    tenth means for correcting output signals of the ninth means into the TCI signals in response to a corrective signal in the reproduced composite signals;
    eleventh means for generating the information signal in response to a TCI information signal in output signals of the tenth means;

twelfth means for time-base-expanding the TCI signals, and dividing the TCI signals into color signals and luminance signals;

thirteenth means for attenuating high-frequency components of the color signals and the luminance signals relative to low-frequency components thereof in a vertical direction;

fourteenth means for attenuating high-frequency components of output signals of the thirteenth means relative to low-frequency components thereof in a direction along a time base;

fifteenth means for converting output signals of the fourteenth means into conversion-resultant signals; and sixteenth means for adding the information signal to at least one of the conversion-resultant signals at a time position corresponding to a specified line.

4. An apparatus as recited in claim 2, further comprising:

ninth means for reproducing signals from the recording medium;

tenth means for subjecting the reproduced signals to FM demodulation;

eleventh means for attenuating high-frequency components of output signals of the tenth means relative to low-frequency components thereof in a horizontal direction;

twelfth means for correcting output signals of the eleventh means into the TCI signals in response to a corrective signal in the reproduced signals;

thirteenth means for generating the information signal in response to a TCI information signal in output signals of the twelfth means;

fourteenth means for time-base-expanding the TCI signals, and dividing the TCI signals into color signals and luminance signals;

fifteenth means for attenuating high-frequency components of the color signals and the luminance signals relative to low-frequency components thereof in a vertical direction;

sixteenth means for attenuating high-frequency components of output signals of the fifteenth means relative to low-frequency components thereof in a direction along a time base;

seventeenth means for converting output signals of the sixteenth means into conversion-resultant signals; and eighteenth means for adding the information signal to at least one of the conversion-resultant signals at a time position corresponding to a specified line.

5. An apparatus as recited in claim 1, wherein a time position of the specified line is outside a period of time during which the input video signal represents display picture information, and the TCI information signal and the corrective signal in the composite signals correspond to predetermined lines represented by the composite signals, the predetermined lines having time positions outside a period of time during which the composite signals represent the display picture information.

* * * * *